(12) United States Patent
Wall et al.

(10) Patent No.: US 10,215,263 B2
(45) Date of Patent: Feb. 26, 2019

(54) AIR SPRING ACTUATED SLIDER FOR SEMI-TRAILER

(71) Applicant: REYCO GRANNING, LLC, Mt. Vernon, MO (US)

(72) Inventors: Kenneth Wall, Springfield, MO (US); Michael Gustave Ochse, Springfield, MO (US)

(73) Assignee: REYCO GRANNING, LLC, Mt. Vernon, MO (US)

( * ) Notice: Subject to any disclaimer, the term of this patent is extended or adjusted under 35 U.S.C. 154(b) by 256 days.

(21) Appl. No.: 15/195,709

(22) Filed: Jun. 28, 2016

(65) Prior Publication Data

US 2017/0370451 A1 Dec. 28, 2017

(51) Int. Cl.
| | |
|---|---|
| *F16H 21/44* | (2006.01) |
| *F16H 21/54* | (2006.01) |
| *F16H 25/18* | (2006.01) |

(52) U.S. Cl.
CPC .................................. *F16H 21/44* (2013.01)

(58) Field of Classification Search
CPC .............................. F16H 21/44; B62D 53/068
See application file for complete search history.

(56) References Cited

U.S. PATENT DOCUMENTS

| | | |
|---|---|---|
| 2,860,891 A | 11/1958 | Ramun |
| 2,900,194 A | 8/1959 | De Lay |
| 3,778,079 A | 12/1973 | Vomberger et al. |
| 4,286,797 A | 9/1981 | Mekosh, Jr. et al. |
| 4,641,846 A | 2/1987 | Ehrhart |
| 4,838,566 A | 6/1989 | Baxter et al. |
| 4,838,578 A | 6/1989 | Baxter |
| 4,919,445 A | 4/1990 | Robey |
| 4,944,522 A | 7/1990 | Hart |
| 4,993,737 A | 2/1991 | Torcomian |
| 5,088,758 A | 2/1992 | Wall et al. |
| 5,088,763 A | 2/1992 | Galazin et al. |
| 5,137,296 A | 8/1992 | Forman |
| 5,199,732 A | 4/1993 | Lands et al. |
| 5,218,280 A | 6/1993 | Edwards |
| 5,449,187 A | 9/1995 | Schueman |
| 5,449,190 A | 9/1995 | Ford |
| 5,451,069 A | 9/1995 | Schueman |
| 5,460,237 A | 10/1995 | Schueman |
| 5,462,301 A | 10/1995 | Schueman |
| 5,474,149 A | 12/1995 | Schueman |

(Continued)

*Primary Examiner* — Jake Cook (74) *Attorney, Agent, or Firm* — Greer, Burns & Crain, Ltd.

(57) ABSTRACT

An air spring actuated slider pin release system for a semi-trailer slider includes an actuator shaft oriented to extend in generally parallel relationship to at least one of a pair of parallel main members, being connected to the slider for axial rotation, and having a transverse lever arm secured to each end of the shaft for common rotation. Each lever arm has an end connected to a retractable, biased lock pin via a link so that rotation of the shaft and the lever arms causes retraction of the associated lock pin relative to the main member. The actuator shaft has a normally projecting air spring bracket. An air spring is disposed between one of the main members and the air spring bracket so that inflation of the air spring acts on the air spring bracket, axially rotating the shaft and the lever arms for retracting the lock pins.

17 Claims, 6 Drawing Sheets

(56) References Cited

U.S. PATENT DOCUMENTS

| | | |
|---|---|---|
| 5,476,277 A | 12/1995 | Schueman |
| 5,480,171 A | 1/1996 | Cheffey |
| 5,507,511 A | 4/1996 | Schueman |
| 5,531,467 A | 6/1996 | Schueman |
| 5,564,725 A | 10/1996 | Brazeal |
| 5,720,489 A | 2/1998 | Pierce et al. |
| 5,813,682 A | 9/1998 | Stevens |
| 5,833,253 A | 11/1998 | Hess |
| 6,213,489 B1 | 4/2001 | Eckelberry |
| 6,279,933 B1 | 8/2001 | Ross et al. |
| 6,409,192 B1 | 6/2002 | Botts |
| 6,435,536 B2 | 8/2002 | Eckelberry |
| 7,163,220 B2 | 1/2007 | Pappas |
| 7,207,593 B2 | 4/2007 | Saxon et al. |
| 7,533,896 B2 | 5/2009 | Zhang et al. |
| 7,591,336 B2 | 9/2009 | Hackmann |
| 7,604,248 B2 | 10/2009 | Bromley et al. |
| 7,690,664 B2 | 4/2010 | Saieg et al. |
| 8,272,654 B2 | 9/2012 | Xie |
| 2005/0056477 A1* | 3/2005 | Saieg ........................ B60T 7/20 180/209 |

\* cited by examiner

AIR SPRING ACTUATED SLIDER FOR SEMI-TRAILER

BACKGROUND

This invention relates generally to pin retractors for semi-trailers also referred to as semi-trailer tandems, and more specifically to a relatively simple mechanism for retracting multiple pins of a tandem using an air spring.

Conventional semi-trailers of the type hauled over the road by trucks connect to the truck at a hitch or fifth wheel, and include a tandem, referring to a pair or multiple pairs of parallel axles. In many trailers, the tandem is slidable forward and backward relative to the trailer for adjusting the load on the rear axle or axles. The ability to move the tandem relative to the cargo containing portion of the semi-trailer is desirable for a number of reasons. When a tractor and semi-trailer must maneuver around city streets, relatively tight corners are common. By moving the tandem forward, it is easier to negotiate tight corners. In contrast, when traveling on highways, moving the tandem to the rear of the cargo container puts a larger percentage of the load on the axles of the tractor, providing a better ride.

The tandem is secured in position relative to the trailer using at least one and preferably four retractable lock pins. The pins are typically provided in pairs, members of each pair engaging opposing points of left and right rails on the trailers. Being biased, usually by a coiled spring or the like, the pins extend laterally or transversely to the direction of travel of the trailer and engage openings in the depending rails having a linear array of the openings for accommodating various trailer/slider positions. Using the pins, the slider is held in position relative to the trailer.

When the pins are retracted, they are also disengaged from the openings or apertures in the trailer rails, and allow the trailer to be slid forward or backwards relative to the slider. It is conventional to provide a front and/or rear stop for preventing excessive travel of the trailer relative to the slider to the extent that the slider disengages from the trailer.

While manual mechanisms are well known for retracting the lock pins, they are subject to jamming, and are inherently more labor intensive for the operator. Pneumatically powered pin retraction mechanisms have been developed, but are considered costlier and mechanically more complicated than the manual systems. In the latter systems, a shaft rotates under the power of a pneumatic inflatable member, which retracts the pins. Air is supplied to the pneumatic pin retraction system from the existing vehicle trailer braking system. Conventional pneumatic pin retraction systems are considered more prone to breakdown and require relatively more maintenance than manual systems.

Thus, there is a need for an improved automatic slider locking pin system that addresses the above-identified drawbacks.

SUMMARY

The above-listed need is met or exceeded by the present air spring actuated slider for a semi-trailer, which features a single pneumatic actuator, constructed and arranged so that inflation of the actuator causes rotation of a main actuator shaft that extends parallel to the axis of the trailer. Rotation of the shaft causes retraction of the lock pins, overcoming an outward biasing force. Thus, a single inflatable member controls the retraction of all four lock pins. Preferably, the inflatable member, an air spring, is disposed directly between one of the slider frame members and an air spring bracket integral with the actuator shaft. Thus, inflation or deflation of the air spring causes respective rotation of the actuator shaft through the air bracket.

In addition, the lock pins are connected to the shaft via linkages that are secured to levers of the shaft using a tab and slot connection system without the use of tools. The present slider pin retraction mechanism is relatively easily assembled, so that all the components are in place prior to installation of the air spring, which exerts tension on the system. Another feature of the present system is that the actuator shaft is located in an offset position on the slider, being closer to one of the main frame members than to the other.

More specifically, the present invention provides an air spring actuated slider pin release system for a semi-trailer slider having a pair of main members extending along a longitudinal axis of the slider, and at least one cross member separating the main members in spaced, parallel relationship to each other. Included in the air spring actuated slider pin release system is an actuator shaft oriented to extend in generally parallel relationship to at least one of the main members, being connected to the slider for axial rotation, and having a transverse lever arm secured to each end of the shaft for common rotation. Each lever arm has an end connected to a retractable, biased lock pin via a link so that rotation of the shaft and the lever arms causes retraction of the associated lock pin relative to the main member. The actuator shaft has a normally projecting air spring bracket. An air spring is disposed between one of the main members and the air spring bracket so that inflation of the air spring acts on the air spring bracket, axially rotating the shaft and the lever arms for retracting the lock pins.

DETAILED DESCRIPTION

Figure 1:
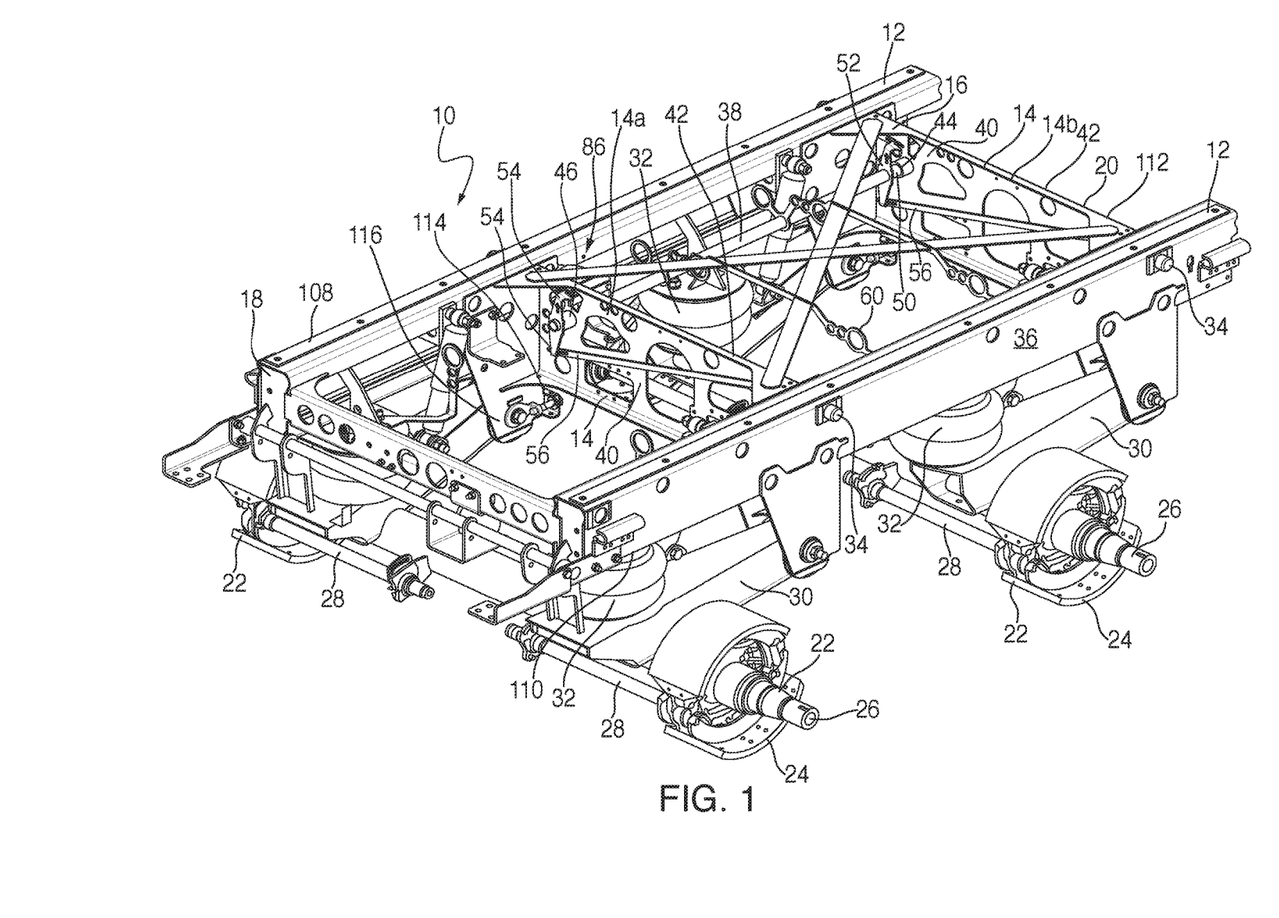
FIG. 1 is a top perspective view of the present slider.
Figure 2:
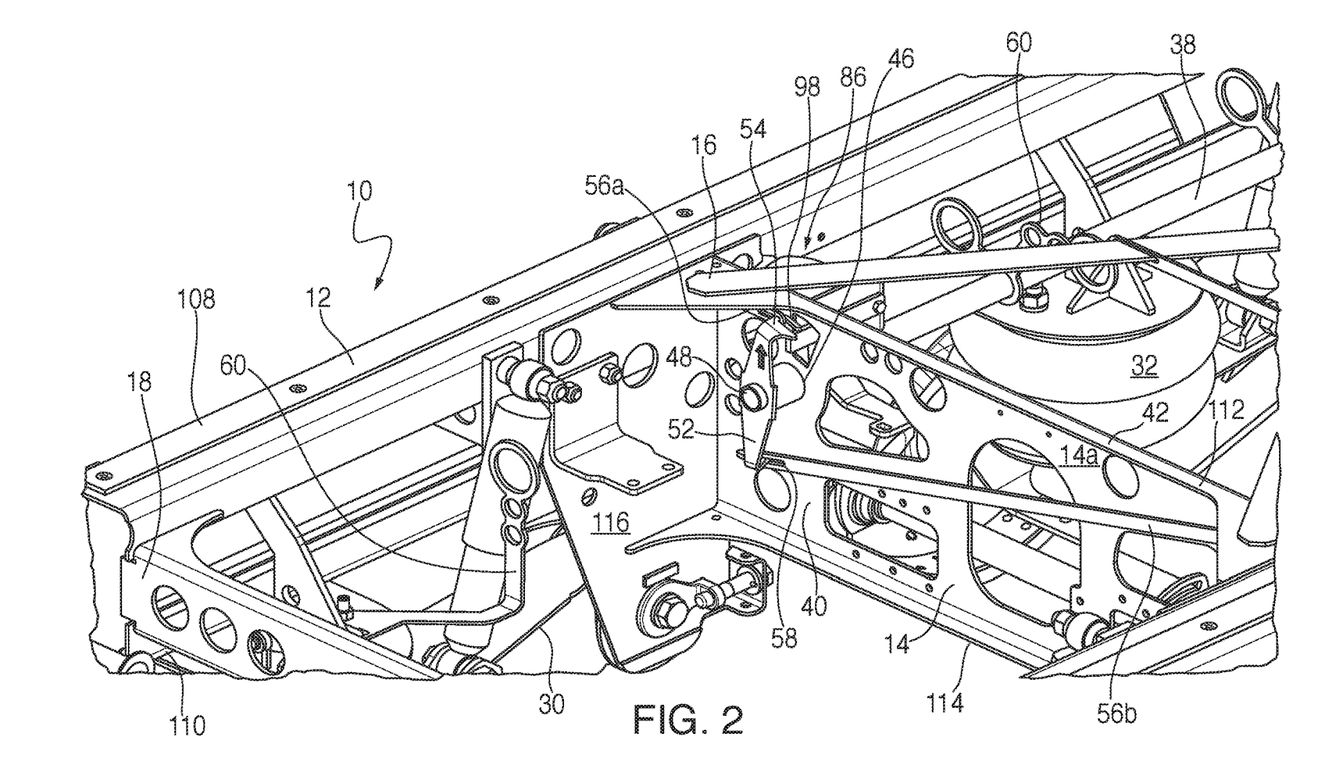
FIG. 2 is an enlarged fragmentary view of the slider of FIG. 1.

Referring now to FIGS. 1 and 2, a semi-trailer slider is generally designated 10 and includes a pair of spaced, parallel main members 12 extending along a longitudinal axis of the slider, rigidly secured to each other by a pair of transverse cross members 14 by welding or other fastening technique well known in the art. Once joined, the members 12 and the cross members 14 form a slider frame 16. As is known in the art, the slider frame 16 has a front end 18 facing a front of the trailer and the tractor (not shown), and an opposite rear end 20. Also, as is common, the slider 10 provides for at least one and preferably a pair of sets of trailer wheel mounting points 22, each having associated brakes 24, axle spindles 26, connecting arms 28, suspension trailing arms 30, pneumatic springs 32 and other running gear components well known to those skilled in the art.

As is common with such sliders 10, at least one and preferably four biased retractable lock pins 34 extend laterally beyond outer surfaces 36 of the associated main members 12. Thus, in the preferred slider 10, two lock pins 34 extend from each surface 36. The present slider pin release system includes an actuator shaft 38 extending between, and supported by the cross members 14. Each of the cross members 14 has a front surface 40 and a rear surface 42. The actuator shaft 38 is rotatably disposed relative to the cross members 14, being located in a socket 44 in the rear cross member 14b and rotatably engaged in a shaft opening 46 in the front cross member 14a. The actuator shaft 38 has first and second ends, 48, 50. A transverse lever arm 52 is securely mounted, as by welding or the like adjacent each end 48, 50 of the actuator shaft 38 for common rotation upon axial rotation of the shaft relative to the slider 10.

In the preferred embodiment, the actuator shaft 38 is disposed to be closer to one of the main members 12 than to the other member. As such, the shaft 38 is laterally offset when viewed from the front or rear ends 18, 20 of the slider frame 16.

Figure 3:
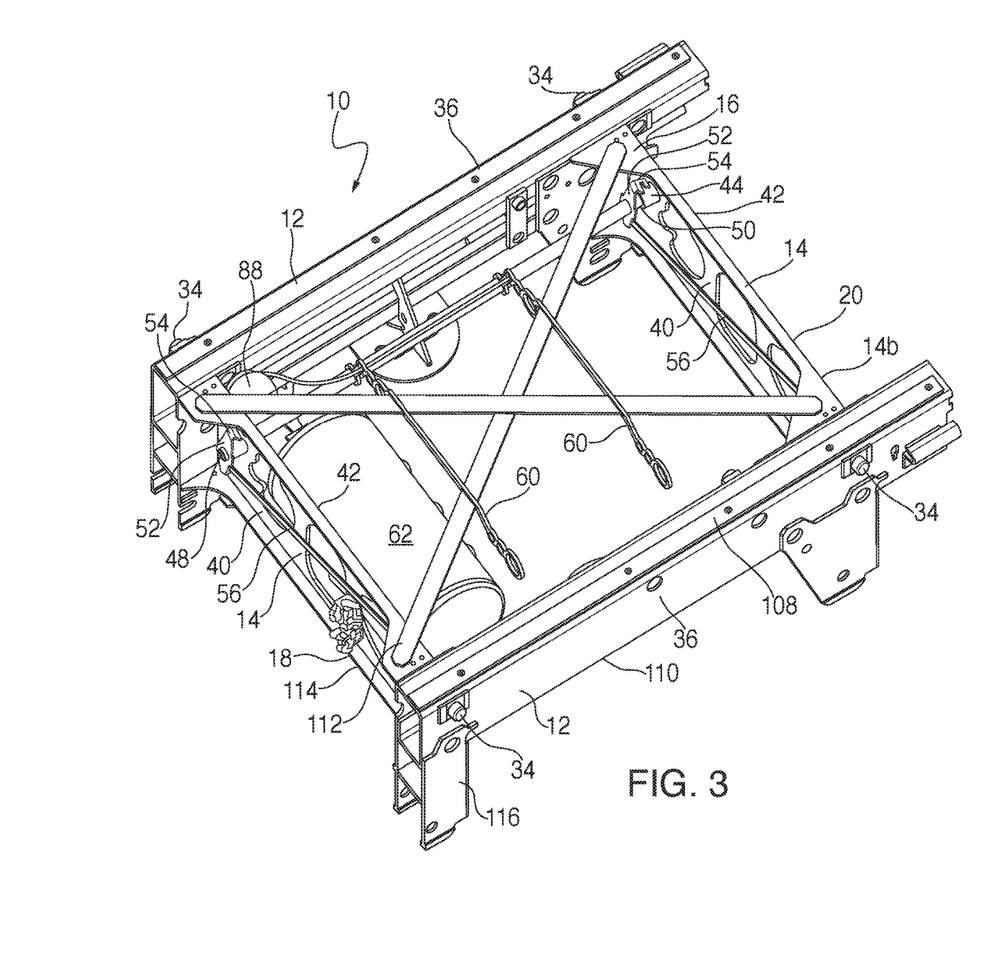
FIG. 3 is a fragmentary overhead perspective view of the present slider.
Figure 4:
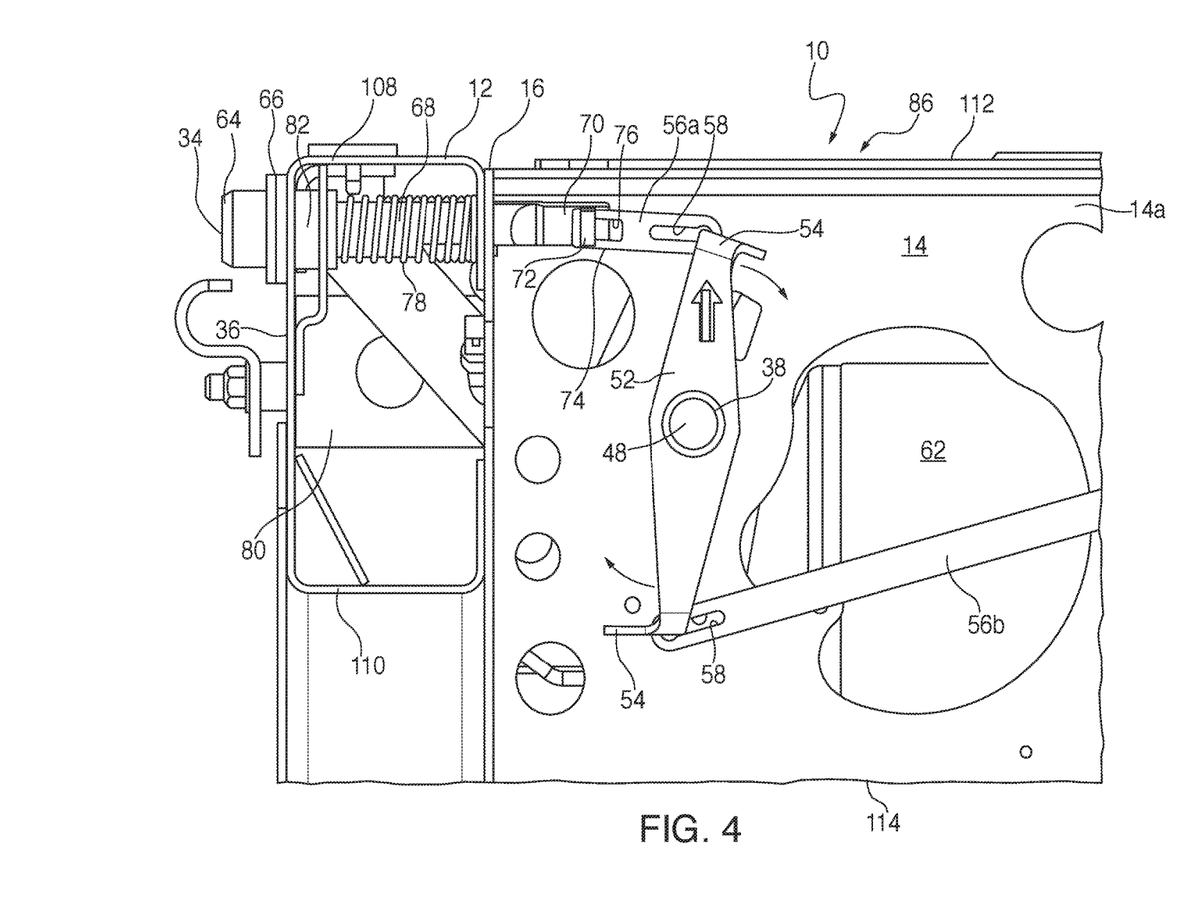
FIG. 4 is an enlarged fragmentary side view of the present lever arm and lock pin assembly.

Referring now to FIGS. 1, 3 and 4, as will be described in greater detail below, the single actuator shaft 38 operates all of the lock pins 34 on the slider 10. Free ends 54 of the lever arm 52 are connected to the corresponding lock pins 34 via elongate linkage elements 56, such as metal straps. More specifically, each ever arm free end 54 is associated with a particular lock pin 34. For reaching the lock pins 34 located relatively close to the actuator shaft 38 as well as relatively farther away, the linkage elements 56 are provided in short lengths 56a and longer lengths 56b (FIG. 4).

The lever arm free ends 54 are each preferably provided in a hook or tab configuration (Best seen in FIGS. 2 and 3) which slidably engages corresponding slots 58 in the linkage elements 56. Thus, the linkage elements 56 are assembled on the lever arms 52 without the use of tools.

As seen in FIG. 3, also as known in the art, the slider 10 is preferably provided with a plurality of multi-apertured air line guides 60 for supporting the vehicle air lines 61 (FIG. 5) transmitting pressurized air from one end of the slider to the other. The air line guides 60 are preferably connected to the actuator shaft 38. The slider frame 16 is also preferably provided with a compressed air storage tank 62 in fluid communication with the slider and the vehicle pneumatic power systems as known in the art.

Referring now to FIG. 4, further details are shown of the connection between the lock pins 34 and the lever arms 52. Each lock pin 34 includes an end 64 projecting from the main member surface 36 and is held in place in part by a radial flange 66. An elongate pin shaft 68 extends from the end 64, passes through the main member 12, and has an opposite, connection end 70 with a generally "T"-shaped stud or lug 72 projecting generally perpendicularly from the shaft 68. The stud 72 releasably engages a pin end 74 of the linkage element, here linkage element 56a. Although the shape may vary to accommodate the application, the pin end 74 has an aperture 76 constructed and arranged for positively and releasably engaging the stud 72 without the use of tools. Also, a pin return spring 78 surrounds the pin shaft 68 and is disposed in an interior space 80 of the member 12. By engaging an integral collar 82 on the pin shaft 68, the spring 78 urges the lock pin end 64 outwardly relative to the member 12. While only one of the lock pins 34 is shown in detail, it will be understood that all four lock pins in the slider 10 are similarly constructed and arranged.

As the actuator shaft 38 rotates clockwise, it will be seen that the lever arm 52 pulls on the respective linkage elements 56a, 56b, causing the elongate pin shafts 68 to move inboard away from the outer member surfaces 36 and thus overcoming the biasing force exerted by the spring 78. Upon sufficient rotation of the actuator shaft 38, the lock pin 34 will be fully retracted. It should be noted in FIG. 4 that the free ends 54 of the lever arm 54 each extend in opposite directions, reflecting the direction from which the respective linkage element 56a, 56b extends. Also, the lever arm 54 rotates in a plane that is parallel to that of the cross member 14 and transverse to the axis of the actuator shaft 38.

Figure 5:
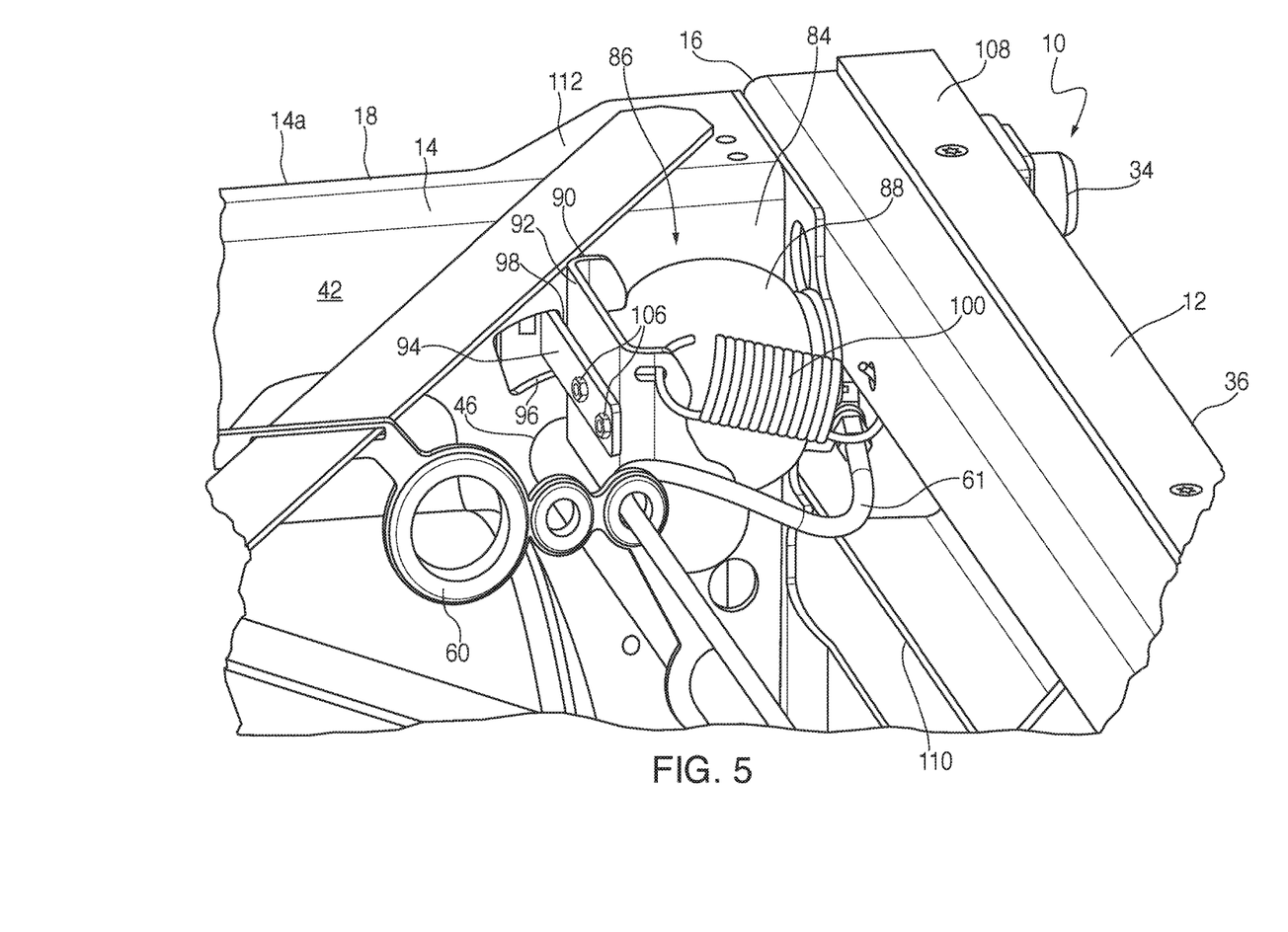
FIG. 5 is a fragmentary top perspective view of the present air spring disposed in the slider and connected to the pin retraction mechanism.

Referring now to FIG. 5, a view on the opposite side of the main member 12 depicts an interior 84 of the slider frame 16. An important feature of the present slider pin retraction system, generally designated 86, is the provision of an inflatable air spring 88 disposed between one of the main members 12 and an air spring bracket 90 fixed to the actuator shaft 38 for common rotation. The air spring 88 is in fluid communication with the vehicle pressurized air system and the storage tank 62. In the preferred embodiment, the air spring bracket 90 projects perpendicularly or normally to the axis of the actuator shaft 38, and features a generally flat base 92 generally parallel to and opposing the adjacent member 12. The air spring 88 is preferably an inflatable bladder disposed between the main member 12 and the air spring bracket 90 so that inflation of the air spring acts directly on both the main member 12 and the air spring bracket, and thus directly upon the actuator shaft 38, axially rotating the air spring bracket, the actuator shaft and the lever arms 52 about the axis which is parallel to the main member and to the direction of travel of the slider 10 to simultaneously retract all of the lock pins 34 on the slider.

In the preferred embodiment, as is the case with the actuator shaft 38, the air spring 88 and the air spring bracket 90 are located closer to one of the main members 12 than to the other. More specifically, although other locations are contemplated on the slider frame 16, it is preferred that the air spring 88 and the air spring bracket 90 are located in a corner defined by adjacent ends of the corresponding main member 12 and the closest cross member 14. Also, the air spring 88 and the air spring bracket 90 are located on one side of the associated cross member 14, and the closest lever arm 52 is located on the opposite side of the cross member.

Another feature of the air spring bracket 90 is a stop member 94, more specifically a stop bar secured to an opposite surface of the bracket from the air spring 88, and projecting laterally from the bracket. The stop member 94 passes through an opening 96 in the cross member 14 so that as the air spring 88 is deflated (pins extending), the bracket 90 will tilt backwards, rotating the actuator shaft 38, until the stop member contacts an edge 98 of the opening. At the point of contact, the deflating movement of the air spring bracket 90, and the rotation of the actuator shaft 38 will stop. Thus, the air spring 88 is prevented from collapsing excessively. At this point, the four lock pins 34 are fully extended, preventing sliding of the slider 10 relative to the trailer.

Once the operator is ready to lock the slider 10 in its new position relative to the trailer, the air spring 88 is depressurized. A bracket return spring 100 connected between the air spring bracket 90 and the member 12 reverses the action caused by the air spring 88 and pulls the bracket back to the default (extended pin) position, releasing the pulling force on the linkage elements 56a, 56b and allowing the pin return springs 78 to force the pin ends 64 back outwards relative to the outer member surfaces 36.

Figure 6:
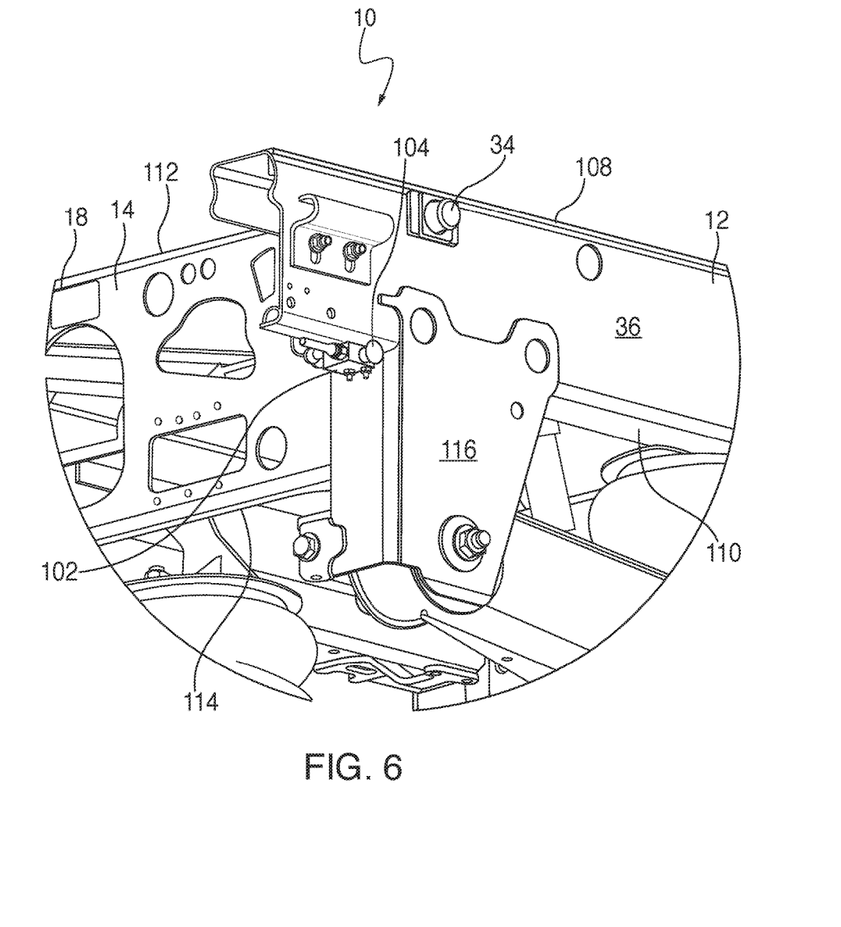
FIG. 6 is a fragmentary bottom perspective view of the present slider showing the actuation button.

Referring now to FIG. 6, the operator controls the retraction of the lock pins 34 by the inflation/deflation of the air spring 88 through a conventional manually activated air valve 102. As is well known in the art, the air valve 102 is in fluid communication with the air spring 88 and with the vehicle pressurized air system. Although a variety of manually activated valves are contemplated, the present air valve 102 is of the pull/push button type. To activate the air spring 88, and retract the lock pins 34, the operator pulls on the air valve control button 104. Once the vehicle operator has completed the movement of the slider 10 relative to the trailer, and desires that the slider and the trailer are locked together for travel, the control button 104 is pushed in, causing deflation of the air spring 88. As the spring 88 deflates, counter rotation of the actuator shaft 38 is assisted by the biasing action of the spring 100. Also, the biasing action of the pin return springs 78 pushes the lock pins 34 to the laterally outwardly projecting locking positions shown in FIG. 1.

Referring now to FIGS. 1 and 5, in the preferred embodiment, at least one mounting bolt 106 is used to secure the stop member 94 to the air spring bracket 90. In addition, the same bolt 106 or bolts secure(s) the air spring 88 in position on the bracket 90. It will be seen that the air spring 88 and the air spring bracket 90 are disposed within a space defined by upper and lower edges 108, 110 of the main members 12 and upper and lower edges 112, 114 of the at least one cross member 14. Another feature of the present slider 10 is that the air spring 88 and the air spring bracket 90 are connected to the associated main member 12 at a suspension hanger bracket 116 (FIG. 6).

During installation of the slider pin retraction system 86, the actuator shaft 38 and the air spring bracket 90 are installed in the slider frame 16. Next, the lever arms 52 are then secured to the actuator shaft 38 and the linkage elements 56a, 56b are connected between the lever arms and the lugs 72 on the pin shafts 68. The hook-like tab configuration of the free ends 54 of the lever arms 52 are sufficiently long so that the linkage elements 56a, 56b are retained on the lever arm through the full range of rotation of the actuator shaft 38. Once all of the linkages 56a, 56b for all of the lock pins 34 are installed, the air spring bracket 90 is rotated sufficiently relative to the associated main member 12 so that sufficient clearance is created for installation of the air spring 88 and the stop member 94.

While a particular embodiment of the present air spring actuated slider for semi-trailer has been described herein, it will be appreciated by those skilled in the art that changes and modifications may be made thereto without departing from the invention in its broader aspects and as set forth in the following claims.

The invention claimed is:

1. An air spring actuated slider pin release system for a semi-trailer slider having a pair of main members extending along a longitudinal axis of the slider, and at least one cross member separating the main members in spaced, parallel relationship to each other, comprising:
   an actuator shaft oriented to extend in a generally parallel relationship to at least one of the main members, being connected to said slider for axial rotation, and having a transverse lever arm secured to each end of said shaft for common rotation;
   each said lever arm having an end connected to a retractable, biased lock pin so that rotation of said shaft and said lever arms causes retraction of said associated lock pin relative to the main member;
   said actuator shaft having a normally projecting air spring bracket; and
   an air spring disposed between one of the main members and said air spring bracket so that inflation of said air spring acts on said air spring bracket, axially rotating said shaft and said lever arms for retracting said lock pins.

2. The slider pin release system of claim 1, wherein said air spring acts directly on said actuator shaft via said air spring bracket.

3. The slider pin release system of claim 1, wherein said air spring is an inflatable bladder disposed to exert inflation pressure between the corresponding main member and said air spring bracket.

4. The slider pin release system of claim 1, further including a return spring connected to said air spring bracket and the corresponding main member for rotating said shaft and said levers in an opposite direction from that caused by said air spring, for causing extension of said lock pins.

5. The slider pin release system of claim 1, wherein said air spring and said air spring bracket are located closer to one of the main members than the other.

6. The slider pin release system of claim 5, wherein said air spring and said air spring bracket are located in a corner defined by the at least one cross member and one of the main members.

7. The slider pin release system of claim 5, wherein said actuator shaft is located closer to one of the main members than the other.

8. The slider pin release system of claim 1, wherein inflation of said air spring causes retraction of four of said lock pins on said slider.

9. The slider pin release system of claim 1, further including an operator-actuated valve associated with said frame and connected to said air spring for causing selective inflation of said air spring.

10. The slider pin release system of claim 1, in which each said lever arm is connected to a short and a long linkage for controlling movement of said lock pins.

11. The slider pin release system of claim 10, in which each said lever arm has a tab constructed and arranged for engaging a slot on said associated linkage, which in turn engages a stud associated with a corresponding one of said link pins.

12. The slider pin release system of claim 11, wherein said tabs and slots are constructed and arranged so that said tabs are engaged in said slots without the use of tools.

13. The slider pin release system of claim 11, wherein said stud is generally T-shaped.

14. The slider pin release system of claim 10, in which said short and long linkages are used to connect said lever arms are connected to slider pins associated with each of said opposite main members for achieving simultaneous retraction of said pins.

15. The slider pin release system of claim 1, further including a stop associated with said air spring bracket for engaging a corresponding one of the cross members for limiting movement of said shaft upon deflation of said air spring.

16. The slider pin release system of claim 15, further including a mounting bolt used to secure said stop, said mounting bolt also secures said air spring to said air spring bracket.

17. The slider pin release system of claim 1, wherein said air spring and said air spring bracket are disposed within a space defined by upper and lower edges of the main members and the at least one cross member.

* * * * *